United States Patent
Terauchi et al.

(10) Patent No.: US 7,098,998 B2
(45) Date of Patent: Aug. 29, 2006

(54) DEPTH MEASURING METHOD AND DEPTH MEASURING APPARATUS

(75) Inventors: Tomoya Terauchi, Saitama (JP); Yasuhiro Oue, Ibaraki (JP)

(73) Assignee: Sanyo Electric Co., Ltd., Osaka (JP)

( * ) Notice: Subject to any disclaimer, the term of this patent is extended or adjusted under 35 U.S.C. 154(b) by 233 days.

(21) Appl. No.: 10/879,756

(22) Filed: Jun. 30, 2004

(65) Prior Publication Data
US 2005/0002559 A1   Jan. 6, 2005

(30) Foreign Application Priority Data
Jun. 30, 2003  (JP) .............................. 2003-186338
Jun. 25, 2004  (JP) .............................. 2004-187969

(51) Int. Cl.
G01C 3/00 (2006.01)
G01C 3/08 (2006.01)
G01C 5/00 (2006.01)

(52) U.S. Cl. .................. 356/3.14; 356/3.01; 356/4.01; 348/139

(58) Field of Classification Search ................ 356/3.14
See application file for complete search history.

(56) References Cited

U.S. PATENT DOCUMENTS

2002/0067474 A1 *  6/2002  Uomori et al. ............ 356/3.01

OTHER PUBLICATIONS

Shokodo, Taniuchida., "Robot Vision." 1990, pp. 181-185.

* cited by examiner

Primary Examiner—Thomas H. Tarcza
Assistant Examiner—Luke D. Ratcliffe
(74) Attorney, Agent, or Firm—McDermott Will & Emery LLP

(57) ABSTRACT

Where a point corresponding to a point of interest P1 is not detected and a depth value thereof is not known and where points corresponding to surrounding points Pi and Pj are detected and depth values of the points Pi and Pj are known, a depth value of the point of interest P1 is determined by interpolation. A provisional corresponding point is determined from the provisional depth value. Region-based search is executed in the neighborhood of the provisional corresponding point so that precision in identifying the location of the corresponding point is improved.

19 Claims, 8 Drawing Sheets

DEPTH MEASURING METHOD AND DEPTH MEASURING APPARATUS

BACKGROUND OF THE INVENTION

1. Field of the Invention

The present invention relates to a depth measuring technique and, more particularly, to a method and apparatus for measuring depth by a stereo method.

2. Description of the Related Art

As shown in "Robot Vision" (Taniuchida, Shokodo 1990, pp. 181–185), a technique is known which detects corresponding points in two images and measures depth of each point in the images by applying the principle of triangulation.

Methods for detecting corresponding points in images are classified roughly into the "feature-based" method and the "region-based" method. The feature-based method establishes correspondence between characteristic parts in images. More specifically, points in a second image that are candidates of correspondence with a point of interest in a first image are identified in successive steps with increasing degree of specificity, based on an attribute of the point of interest in the first image. When a single point is identified, the point is identified as a corresponding point. The region-based method establishes correspondence based on a correlation score of a region surrounding a target pixel. A point with the best correlation score in a search range is determined as a corresponding point.

Accuracy of identifying a corresponding point in the feature-based method depends on accuracy of feature detection. Generally, feature detection tends to pick up noise components as a result of, for example, detecting high frequency components. Accordingly, noise-free detection of a feature is difficult. Moreover, the number of reliable feature points is limited so that depth measurement in the whole image is subject to constraints.

The region-based method is weak in processing an image with repeated patterns. Moreover, if a search range is large, the computation load is correspondingly heavy. If a search range is narrowed, there is likelihood that a corresponding point is missed. As described above, both methods have good points and bad points.

Related Art List

Robot Vision, Taniuchida, Shokodo 1990, pp. 181–185

SUMMARY OF THE INVENTION

The present invention is done in view of the aforementioned circumstances and an object thereof is to provide a technique capable of detecting a larger number of corresponding points than the feature-based method and reducing the computation load in the region-based method. Another object of the present invention is to provide a technique capable of determining, by computation, a corresponding point more accurately and measuring depth more accurately as a result of that, than the related-art technique.

A depth measuring apparatus according to one aspect of the present invention includes: an attribute-based searching section for acquiring a corresponding point in a second image, based on an attribute of a point of interest in a first image; a depth computing section for computing a depth value of the point of interest for which the corresponding point is acquired, by applying the principle of triangulation; a depth interpolating section for computing the depth value of the point of interest for which the corresponding point is not acquired, by interpolation from the depth values of a plurality of points of interest for each of which the depth value is determined; a provisional corresponding point acquiring section for determining a provisional corresponding point for the point of interest for which a corresponding point is not acquired, from the computed depth value (also referred to as provisional depth value); a corresponding point re-computing section for executing region-based search limited to the neighborhood of the provisional corresponding point so as to acquire a more accurate corresponding point than the provisional corresponding point, wherein the depth computing section computes the depth value for the point of interest for which the more accurate corresponding point is acquired by the corresponding point re-computing section.

With this construction, not only a corresponding point is searched for based on an attribute of a point of interest but also a region-based search is executed, so that it is possible to identify a corresponding point for a larger number of points of interest than the related art. Furthermore, accuracy in determining the location of the corresponding point is improved. The region-based search is limited to the neighborhood of a provisional corresponding point so that the cost required for computation is reduced.

A point of interest may be an edge point, for example. An attribute of the edge point may be a feature of an image region on both sides of the edge such as color and texture. The term "edge point" refers to a point on an edge. An edge may be detected in an image using a high-pass filter. Alternatively, pre-processing that facilitates edge detection may be executed by projecting a stripe light onto a subject to take a photograph of the subject.

A depth interpolating section may compute a provisional depth value, based on spatial relationship between a plurality of points of interest for each of which a corresponding point is identified (referred to as primary points of interest) as a result of an attribute-based search or for each of which a depth value is already determined, and points of interest for each of which a corresponding point is not identified (referred to as secondary points of interest).

A correspondent point re-computing section may execute a region-based search limited to the neighborhood of a provisional corresponding point and on an epipolar line of the secondary points of interest in a second image. Since the computation is executed only on the epipolar line, the cost required for computation is low. Benefit from reduction in the computation cost is large since the search is only executed in the neighborhood of the provisional corresponding point.

A depth measuring apparatus according to another aspect of the present invention includes: an attribute-based searching section for acquiring a corresponding point in a second image, based on an attribute of a point of interest in a first image; a depth computing section for computing a depth value of the point of interest for which the corresponding point is acquired, by applying the principle of triangulation; a depth interpolating section for computing the depth value of the point of interest for which the corresponding point is not acquired, by interpolation from the depth values of one or more points of interest for each of which the depth value is determined; a provisional corresponding point acquiring section for determining a provisional corresponding point for the point of interest for which a corresponding point is not acquired, from the computed depth value (also referred to as provisional depth value); a corresponding point re-computing section for executing region-based search limited to the neighborhood of the provisional corresponding point so as to acquire a more accurate corresponding point than the provisional corresponding point, wherein the depth computing section computes the depth value for the point of interest for which the more accurate corresponding point is acquired by the corresponding point re-computing section.

The depth interpolating section in this depth measuring apparatus may set a provisional depth value to a depth value of one of a plurality of primary points in the neighborhood of the point of interest, when the region including the point of interest has a sharp surface. When the region including the point of interest has a flat surface, on the other hand, a depth interpolating section computes the provisional depth value by interpolation from the depth values of a plurality of points of interest for each of which the depth value is determined. With this, an appropriate depth value can be determined depending on the shape of the object. Moreover, a possibility for determining a provisional depth value increases even when the points already having depth values is sparse.

A depth measuring method according to one aspect of the present invention includes the steps of: acquiring a corresponding point in a second image, based on an attribute of a point of interest in a first image; computing a depth value of the point of interest for which the corresponding point is acquired, by applying the principle of triangulation; determining the depth value of the point of interest for which the corresponding point is not acquired, by interpolation from the depth values of a plurality of points of interest for each of which the depth value is determined; determining a provisional corresponding point for the point of interest for which a corresponding point is not acquired, from the computed depth value; executing region-based search limited to the neighborhood of the provisional corresponding point so as to acquire a more accurate corresponding point than the provisional corresponding point, and computing the depth value for the point of interest for which the more accurate corresponding point is acquired by applying the principle of triangulation.

A depth measuring method according to another aspect of the present invention includes the steps of: detecting an edge in a first image; acquiring, based on an attribute of an edge point on the detected edge, a corresponding point in a second image corresponding to the edge point; computing a depth value of the edge point for which the corresponding point is acquired, by applying the principle of triangulation; determining the depth value of the edge point for which a corresponding point is not acquired, by interpolation from the depth values of a plurality of edge points for each of which the depth value is determined; determining a provisional corresponding point for the edge point for which a corresponding point is not acquired, from the computed depth value; executing region-based correlation search on an epipolar line, in the second image, of the edge point for which a corresponding point is not acquired, so as to acquire a more accurate corresponding point than the provisional corresponding point, the search being limited to a portion of the epipolar line in the neighborhood of the provisional corresponding point; computing the depth value for the edge point for which the more accurate corresponding point is acquired, by applying the principle of triangulation; and determining the depth values of points other than the edge points by interpolation from the depth values of the edge points.

A depth measuring method according to still another aspect of the present invention includes the steps of: acquiring a corresponding point in a second image, based on an attribute of a point of interest in a first image; computing a depth value of the point of interest for which the corresponding point is acquired, by applying the principle of triangulation; determining the depth value of the point of interest for which the corresponding point is not acquired, by interpolation from the depth values of one or more points of interest for each of which the depth value is determined; determining a provisional corresponding point for the point of interest for which a corresponding point is not acquired, from the computed depth value; executing region-based search limited to the neighborhood of the provisional corresponding point so as to acquire a more accurate corresponding point than the provisional corresponding point, and computing the depth value for the point of interest for which the more accurate corresponding point is acquired by applying the principle of triangulation.

A depth measuring method according to still another aspect of the present invention includes the steps of: detecting an edge in a first image; acquiring, based on an attribute of an edge point on the detected edge, a corresponding point in a second image corresponding to the edge point; computing a depth value of the edge point for which the corresponding point is acquired, by applying the principle of triangulation; determining the depth value of the edge point for which a corresponding point is not acquired, by interpolation from the depth values of one or more edge points for each of which the depth value is determined; determining a provisional corresponding point for the edge point for which a corresponding point is not acquired, from the computed depth value; executing region-based correlation search on an epipolar line, in the second image, of the edge point for which a corresponding point is not acquired, so as to acquire a more accurate corresponding point than the provisional corresponding point, the search being limited to a portion of the epipolar line in the neighborhood of the provisional corresponding point; computing the depth value for the edge point for which the more accurate corresponding point is acquired, by applying the principle of triangulation; and determining the depth values of points other than the edge points by interpolation from the depth values of the edge points.

Optional combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

Figure 1:
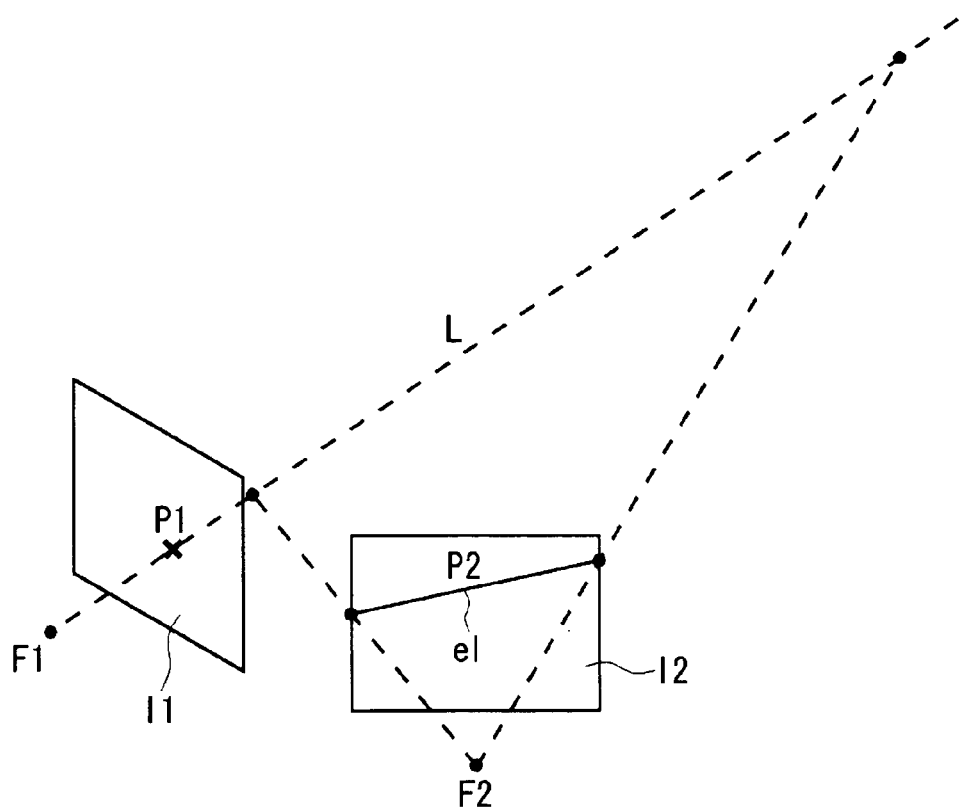
FIG. 1 shows the principle of depth computation using an epipolar line.
Figure 2:
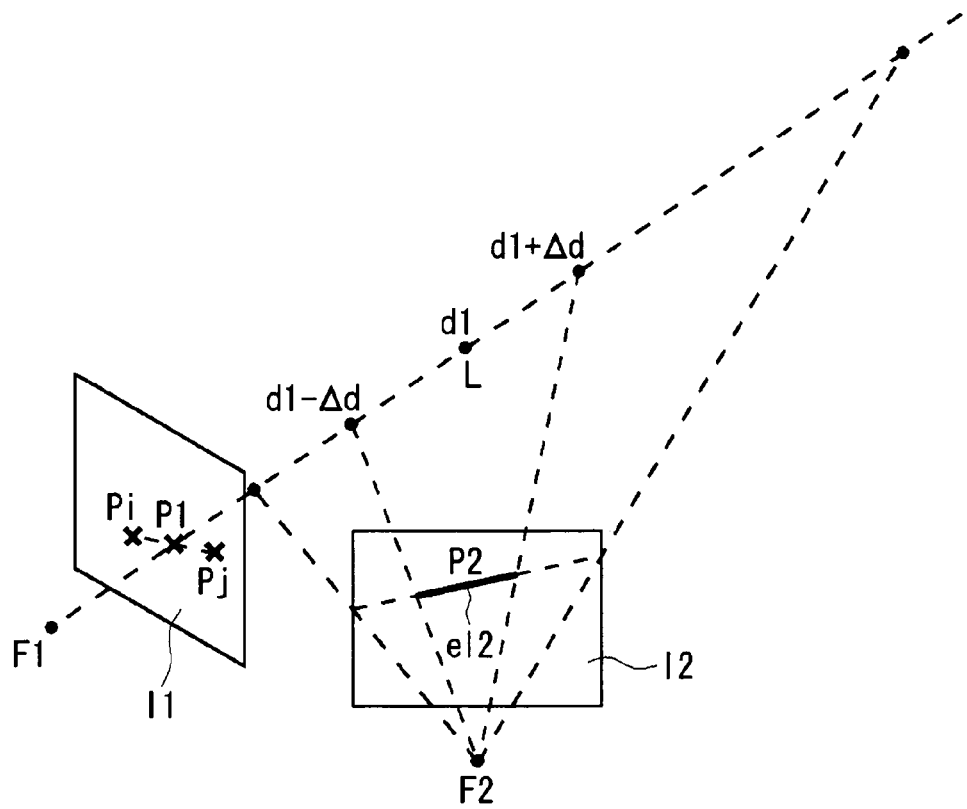
FIG. 2 shows the principle of depth computation using a bounded epipolar line according to an embodiment of the present invention.

FIGS. 1 and 2 show the principle of a depth measuring technique according to an embodiment of the present invention. FIG. 1 schematically shows a corresponding point detection technique generally used in the related art. A corresponding point P2 in a second image I2 corresponding to a point of interest P1 in a first image I1 is determined. Viewing an extension L from a line connecting focus F1 of the first image I1 and the point of interest P1, from a viewpoint of focus F2 of the second image I2, an epipolar line el is defined on the second image I2. The corresponding point P2 is searched for on the epipolar line el.

FIG. 2 shows a feature of the depth measuring technique according to the embodiment. In the embodiment, a provisional depth value for a point of interest, for which a depth is not identified, i.e. a secondary point of interest is determined by interpolation from a point of interest for which a depth is determined, i.e. a primary point of interest. A provisional corresponding point is determined from the provisional depth value. It is then assumed that the corresponding point is located in the neighborhood of the provisional corresponding point on the epipolar line of the secondary point of interest (the neighborhood will be referred to as a bounded epipolar line). In the embodiment, the provisional depth value is put in the computation to determine a provisional depth value for another point, as described later. Accordingly, no distinction is made in the process between a provisional depth value and a depth value identified as a result of an attribute-based search. The term provisional depth is used for convenience in describing the invention.

Figure 3:
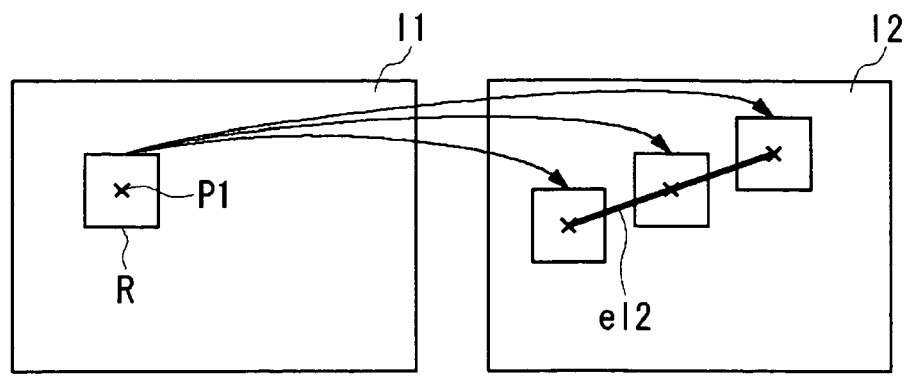
FIG. 3 shows region-based corresponding point search on the bounded epipolar line according to the embodiment.

It is assumed that a secondary point of interest P1 is located intermediate between of two primary points of interest Pi and Pj, and an average of the depth values of these primary points of interest is d1. In this case, the provisional depth value of the secondary point of interest P1 is properly identified as d1. Therefore, the bounded epipolar line el2 is identified as a portion on the epipolar line el of the secondary point of interest P1 between d1−Δd and d1+Δd in the neighborhood of the provisional corresponding point. In the embodiment, it is assumed that the corresponding point P2 corresponding to the secondary point of interest P1 is located on the bounded epipolar line el2. As sown in FIG. 3, region-based matching is executed on the bounded epipolar line el2 so as to identify the location of a region having high correlation with region R around the secondary point of interest P1. The center of the region is identified as the corresponding point P2. A corresponding point corresponding to a secondary point of interest P1 and having a provisional depth value d1 will be referred to as a provisional corresponding point.

Given above is a summary of the embodiment. A region-based search is executed only on the bounded epipolar line. With this, not only the merit from corresponding point search using an epipolar line is enjoyed but also the computation cost is reduced and precision in identifying a corresponding point using a region-based search is improved. Since a corresponding point is identified not only for a primary point of interest but also for a secondary point of interest, correspondence between a larger number of points is established than in the related art. In this way, lack of corresponding points common to the feature-based method for establishing correspondence is eliminated.

In FIG. 2, it is assumed that the secondary point of interest P1 is located intermediate between the primary points of interest Pi and Pj. The idea is generalized using, for example, the concept of position vector. It is assumed that a position vector of a secondary point of interest P (simply referred as P) is denoted by the following equation using position vectors of n primary points of interest Pi (simply referred to as Pi), where Σ is a sum for i=1, 2, . . . n.

$P=\Sigma ai*Pi$ where $\Sigma ai=1$

A provisional depth value d for the secondary point of interest P is denoted by the following equation using the provisional depth value di of the primary point of interest Pi.

$d=\Sigma ai*di$

In FIG. 2, it is assumed that the search is executed in a depth extending by an equal distance of Δd both in the front and back of the provisional corresponding point. Alternatively, the search may be executed in a range extending non-uniformly from the provisional corresponding point.

Figure 4:
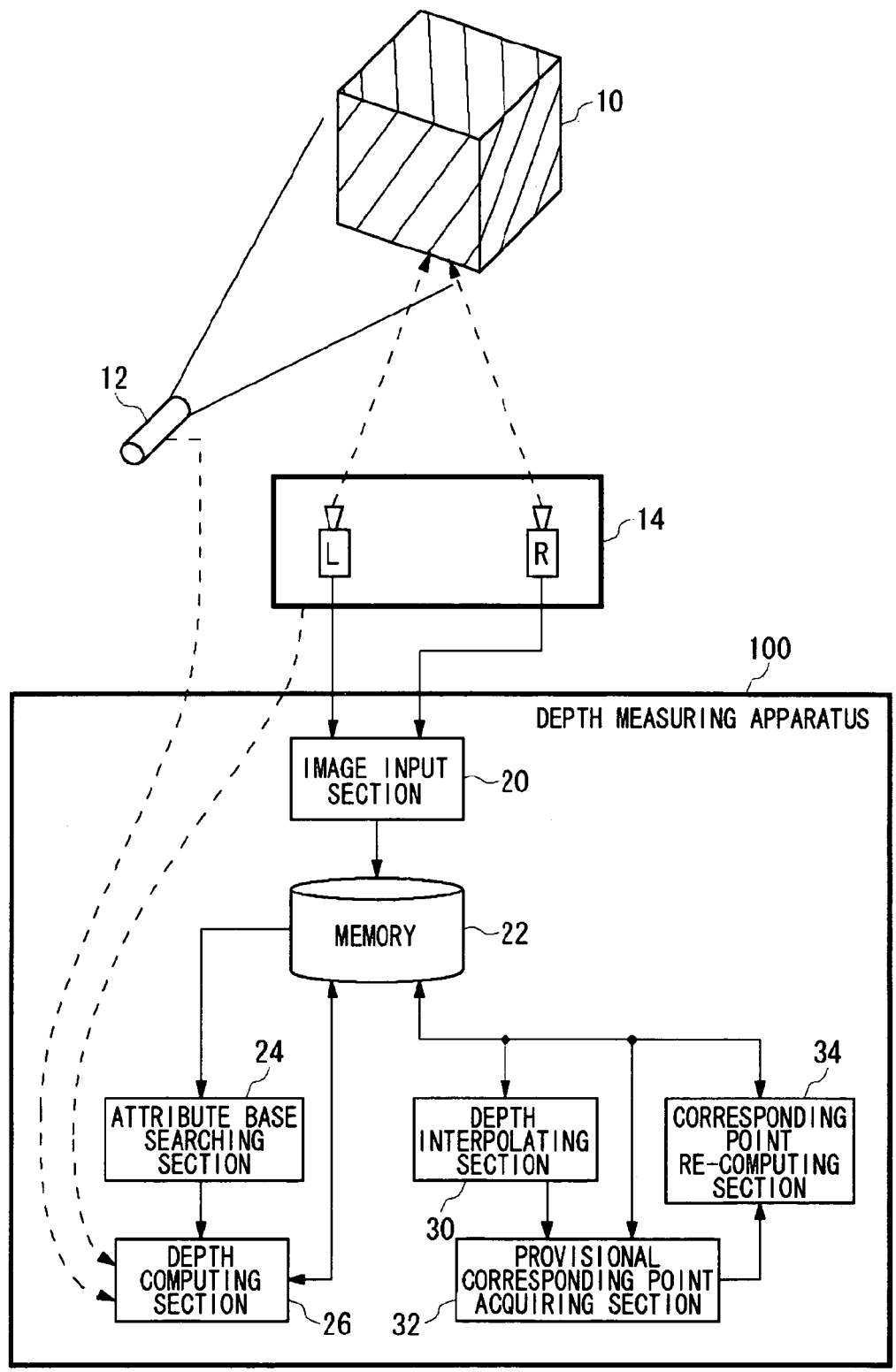
FIG. 4 shows an overall construction of the system including a depth measuring apparatus according to the embodiment.

FIG. 4 shows a construction of a system to which the above principle is applied. The system comprises an object 10 which is modeled, a projector 12 projecting a patterned light, a stereo camera 14 for taking a photograph of the object 10 and a depth measuring apparatus 100 for modeling the object 10 based on outputs from the stereo camera 14. The patterned light is a stripe light composed of a plurality of colors.

The hardware construction of the depth measuring apparatus 100 may comprise a CPU, a memory and other LSIs of any computer. The software construction of thereof may comprise programs having depth measuring functions loaded into the memory. FIG. 4 illustrates functional blocks implemented by combinations of the hardware and software. Accordingly, it would occur to those skilled in the art that the functional blocks may be implemented in various forms including only hardware, only software or combinations of both.

An image input section 20 of the depth measuring apparatus 100 is an interface for receiving right and left images from the stereo camera 14. The right and left images and other data are stored in a memory 22. Of the right and left images, a master image in which a point of interest is defined will be referred to as a first image and a slave image in which a corresponding point is searched will be referred to as a second image.

An attribute-based searching section 24 extracts an edge in the first image and acquires a point in the second image corresponding to each edge point, based on an attribute of the edge point. The attribute used may be color of a stripe on both sides of the edge, or, if the edge point is a unique point, the unique feature itself. For example, if the edge point is where a pixel value is maximum or minimum in the neighborhood thereof, that information may be used as the attribute.

A depth computing section 26 computes a depth value of the edge point for which a corresponding point is acquired using the attribute (also referred to as primary edge point), by applying the principle of triangulation. The depth computing section 26 is provided with location information of the stereo camera 14. A depth interpolating section 30 computes, by interpolation, a provisional depth value of the edge point for which a corresponding point was not acquired (referred to as secondary edge point), based on the depth values of a plurality of primary edge points.

A provisional corresponding point acquiring section 32 determines a provisional corresponding point of the secondary edge point from the provisional depth value. A corresponding point re-computing section 34 executes a region-based search, a cross-correlation search in this case, only on the bounded epipolar line of the secondary edge point so as to acquire a corresponding point more accurate than the provisional corresponding point. The depth computing section 26 refers to the corresponding point thus determined so as compute the depth value for a second time and stores a result of computation in the memory 22 as the final depth value.

Figure 5:
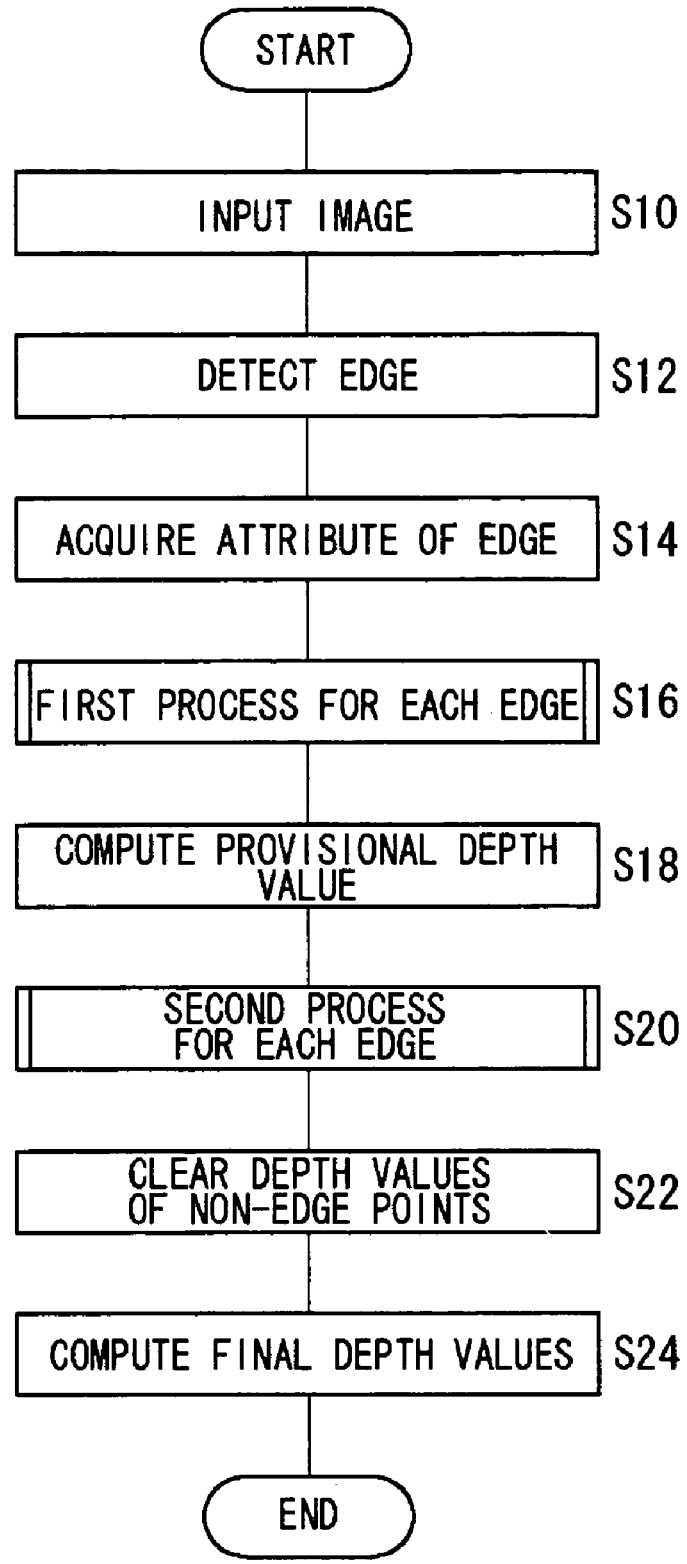
FIG. 5 shows a sequence of steps executed by the depth measuring apparatus according to the embodiment.
Figure 8:
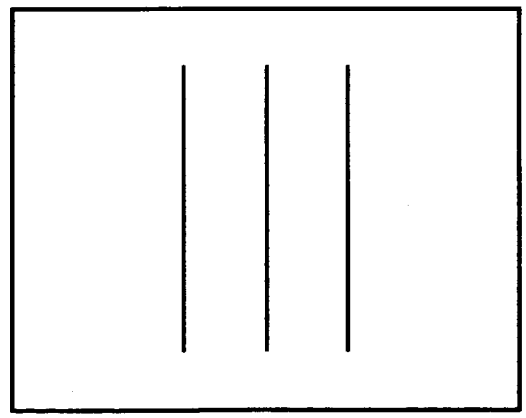
FIG. 8 schematically shows a state in which edge detection in a first image is completed.
Figure 9:
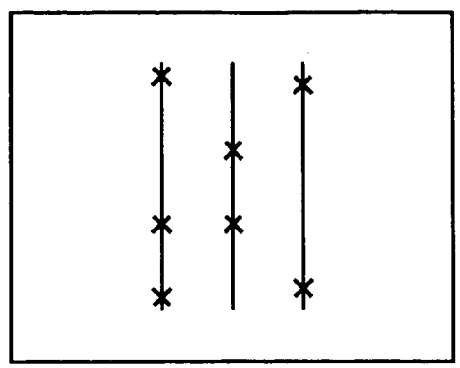
FIG. 9 shows a state in which primary edge points are acquired on edges.

FIG. 5 shows a sequence of steps executed by the depth measuring apparatus 100. A patterned light is projected onto the object 10. The image taken by the stereo camera 14 is input to the memory 22 (S10). The attribute-based searching section 24 detects an edge formed by the striped light as shown in FIG. 8 (S12) and acquires the attribute of the edge (S14). Subsequently, the depth computing section 26 executes a "first process", an attribute-based corresponding point search, described later for each edge point (S16). Pairs each formed by an edge point and a corresponding point thus determined are stored in the memory 22. The primary edge point is schematically shown in FIG. 9. At this point, information relative to points corresponding to the secondary edge points is missing.

Figure 10A:
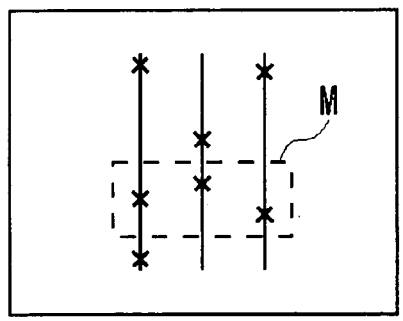
FIGS. 10A and 10B show a method of determining a depth value by interpolation.
Figure 10B:
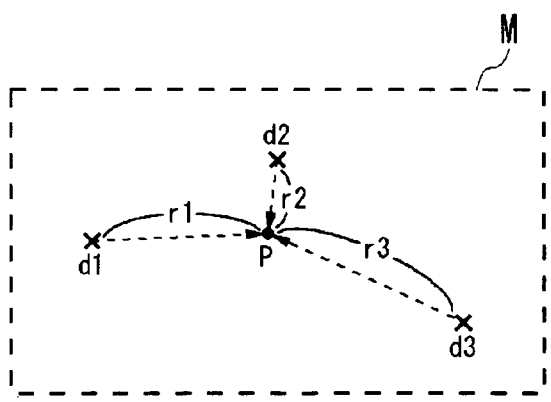
Figure 11:
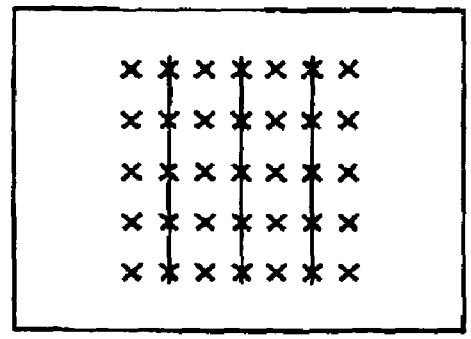
FIG. 11 schematically shows a state in which provisional depth values are determined for all points in the first image.

Subsequently, the depth interpolating section 30 determines the provisional depth value of the secondary edge point (S18) by interpolation. The provisional corresponding point acquiring section 32 and the corresponding point re-computing section 34 execute a "second process", involving acquisition of the provisional corresponding point and a region-based search, described later for each edge point (S20). Interpolation is schematically shown in FIGS. 10A and 10B. For a reason which will be described later, the provisional depth value is determined not only for the edge point but also for all points in the first image. The points for each of which the provisional depth value is determined are schematically shown in FIG. 11.

Figure 12:
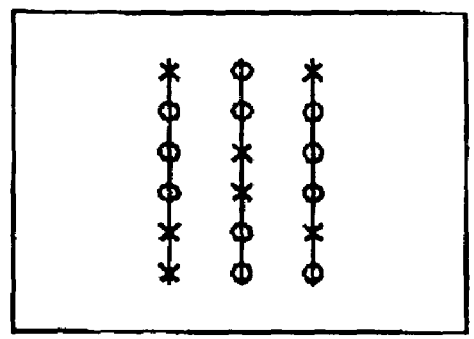
FIG. 12 shows a state in which depth values are determined for all edge points in the first image.

Subsequently, the corresponding point re-computing section 34 clears the depth value determined in S18 for points other than the edge points (hereinafter, simply referred to as non-edge points) (S22), thereby leaving only the information relative to the edge points and their corresponding points. The primary edge points are marked by x and the secondary edge points are marked by o as shown in FIG. 12 explained later. The information relative to all edge points and their corresponding points are thrown into computation by the depth computing section 26 so that the final depth value for all points, i.e. all pixels, are determined by interpolation (S24).

Figure 6:
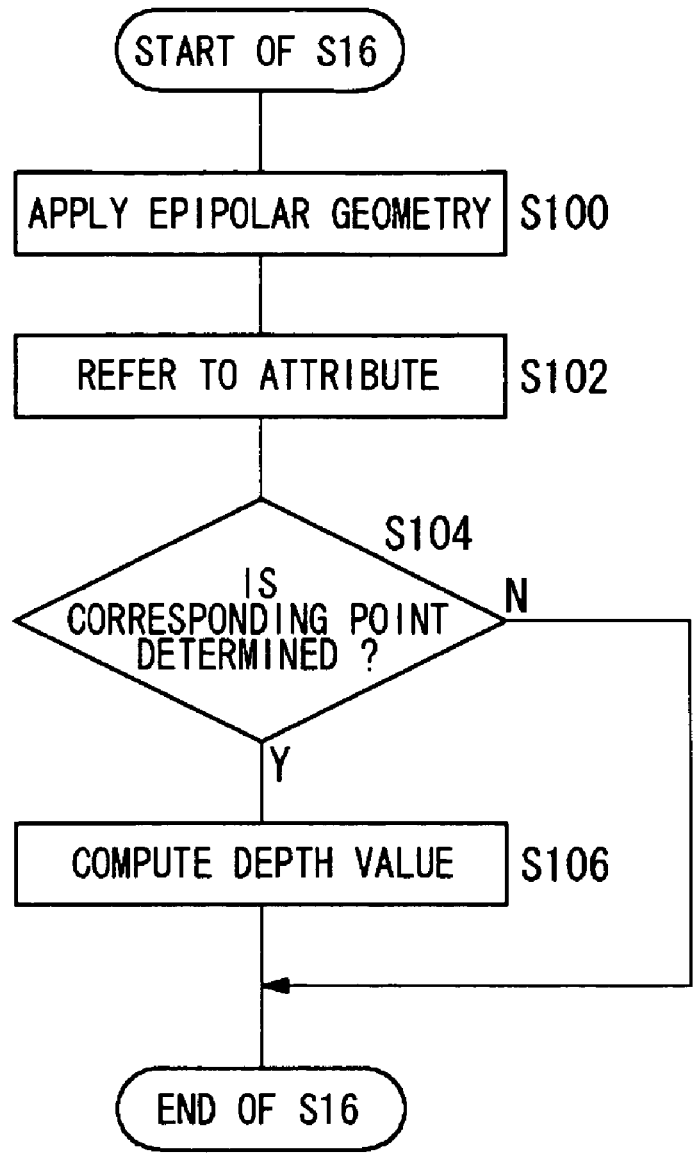
FIG. 6 is a flowchart showing details of S16 of FIG. 5.

FIG. 6 shows the "first process", i.e. step S16. For determination of the corresponding point for an edge point, epipolar geometry is applied (S100) and the attribute of the edge point is referred to (S102). Assuming that the patterned light is composed of a repetition of red, blue and white and the edge point of interest is on the boundary between red and blue, the point corresponding to that edge point is also on the boundary between red and blue, naturally. Since the corresponding point must be on the epipolar line of the edge point of interest, a point of intersection of the boundary and the epipolar line should be a candidate for the corresponding point. The problem is that the boundary between red and blue occurs at regular intervals. Therefore, generally, there is a plurality of candidates. In order to specifically identify the appropriate corresponding point out of the plurality of candidates, one of the blue stripes included in the patterned light may be changed to a different color to disturb periodicity or a known technique that also uses an attribute other than color may be used. Besides the technique of using an attribute other than color, the number of cameras may be increased by, for example, using a trinocular stereo, so that geometrical restrictions are increased. In this case, those points that produce the same depth value even if different slave images are used may be determined to correspond to each other.

When there remains only candidate as a result of these steps, it is determined that the corresponding point is identified (Y in S104). The depth computing section 26 refers to a pair of the corresponding point and the original edge point to compute the depth value by applying the principle of triangulation (S106). Thus, the depth value of the primary edge point is determined. When it is determined in S104 that a single candidate is not identified, or no candidates were detected due to, for example, photograph shooting conditions or the configuration of the object 10, it is determined that the corresponding point cannot be found (N in S104), and the edge point of interest is identified as the secondary edge point so that step S106 is skipped over.

Figure 7:
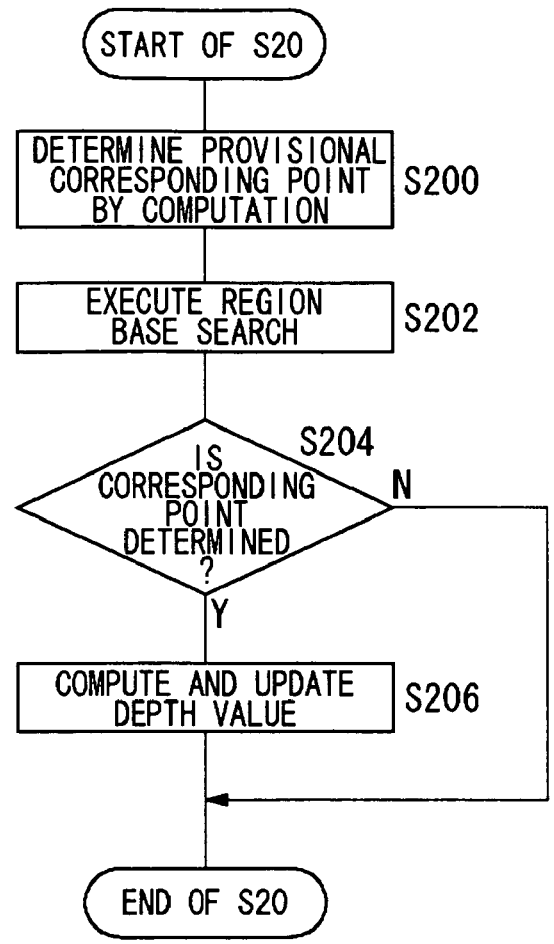
FIG. 7 is a flowchart showing details of S20 of FIG. 5.

FIG. 7 shows the "second process", i.e. step S20. Prior to the second process, the provisional depth value is determined for all points including non-edge points. In S22, the depth values of the non-edge points are cleared and only the depth values of the edge points remain for use. The reason that the provisional depth value is acquired for all points in S18 despite step S22 will now be described. Edges may or may not be properly detected depending on the configuration, color and texture of the object 10. Failure in detection may result in absence of points having a depth value in a mask region M of a predetermined size shown in FIGS. 10A and 10B, wherein interpolation is executed in the mask region so as to determine a provisional depth value of a point not having a depth value, from a point having a depth value. A region in which such absence occurs will be referred to as incomputable region. In order to avoid such absence, interpolation is fully taken advantage of in order to define depth values, provisional or not, in successive steps. No distinction is made between provisional depth values and depth values of primary edge points so that not only depth values of primary edge points but also provisional depth values are used in the subsequent interpolation. In this way, occurrence of an incomputable region is prevented as much as possible. It is natural, however, that, when edges are consistently detected, step S18 is executed only for the edge points. This will reduce the cost required for computation.

In this case, it is assumed that the provisional depth value is determined for all points. The provisional corresponding point acquiring section 32 refers to the provisional depth value so as to identify the location of the provisional corresponding point for all edge points (S200) and executes region-based search on the bounded epipolar line (S202). For the purpose of region-based search, normalized cross-correlation is determined, for example, by the following equation.

$$\frac{\sum_{u,v}(I_1(x_1+u, y_1+v) - \bar{I}_1) \cdot (I_2(x_2+u, y_2+v) - \bar{I}_2)}{\sqrt{\sum_{u,v}(I_1(x_1+u, y_1+v) - \bar{I}_1)^2 \cdot (I_2(x_2+u, y_2+v) - \bar{I}_2)^2}}$$

As another example, a square error sum given below may be obtained.

$$\sum_{u,v} (I_1(x_1 + u, y_1 + v) - I_2(x_2 + u, y_2 + v))^2$$

If a single candidate for the corresponding point is identified as a result of region-based search, it is determined that the corresponding point is found (Y in S204). The depth computing section 26 refers to the pair of the corresponding point and the original edge point to compute and update the depth value by applying the principle of triangulation (S206). Thus, the depth values for all edge points are determined. If, on the other hand, a single candidate is not identified, it is determined that the corresponding point cannot be found (N in S204). Control then exits step S20. Described above is a process executed by the depth measuring apparatus 100.

FIGS. 8–12 schematically show how the corresponding points are determined in the processing flow. FIG. 8 shows a state in which only edge detection in the first image is completed. FIG. 9 shows a distribution of primary edge points. An attribute-based search does not necessarily establish corresponding points for a majority of the edge points. FIG. 9 shows discrete distribution of primary edge points. FIGS. 10A and 10B show how the provisional depth value of each of the entirety of points is determined from the depth values of primary edge points by interpolation. As shown in FIG. 10A, a mask region M of a predetermined size is defined. As illustrated in FIG. 10B, given the depth values d1–d3 of three primary edge points and distances r1–r3 from a given point P to these primary edge points, the provisional depth value d of the given point P included in the mask region M is defined, for example, as follows.

$$d=(d1/r1+d2/r2+d3/r3)/(1/r1+1/r2+1/r3)$$

Referring to FIGS. 10A and 10B, the mask region M is horizontally oriented to ensure that the breadth thereof is larger than the edge interval. An edge is densely populated by primary edge points, while no primary points exist in a horizontal interval between edges. For interpolation, it is desirable that primary edge points be distributed above and below, and to the left of and to the right of a target point to be processed. Particularly, it is desirable that primary edge points surround the target point. Therefore, attention is paid so that a plurality of edge points is included horizontally.

FIG. 11 schematically shows a state in which the provisional depth values are established by interpolation for all points. FIG. 12 shows a state in which region-based search has been executed and the provisional depth values for the non-edge points are cleared. Primary edge points marked by x and secondary edge points marked by o have depth values. Subsequently, the depth values for all points (final solutions) are determined from the depth values of the edge points by interpolation, and the whole process is completed.

Figure 13:
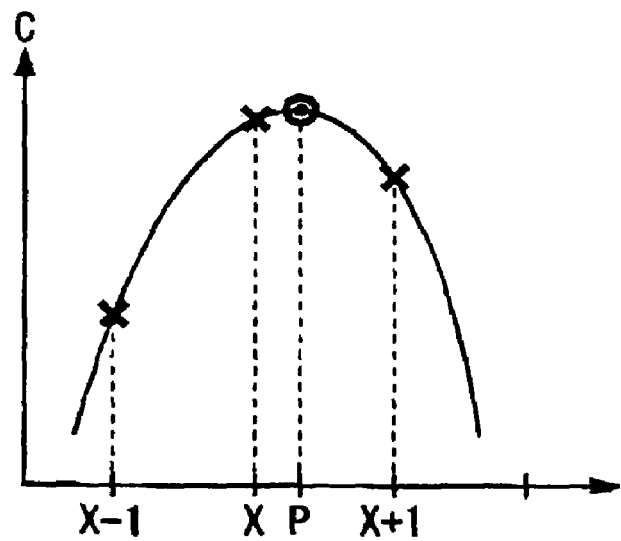
FIG. 13 shows a method of executing region-based search on a subpixel level according to the embodiment.

As shown in FIG. 13, region-based search may be executed in subpixel levels. It is assumed here that, as a result of cross-correlation computation executed while changing the location of the region, the correlation score is maximum when pixel X is located at a reference position in the region. A curve such as a parabola, connecting a cross-correlation value at pixel X and cross-correlation values at adjacent pixels X−1 and X+1, is determined by approximation. The maximum value of the curve is then determined. Referring to FIG. 13, it is determined that cross-correlation score is maximum at pixel P at a sub-pixel level so that the corresponding point is registered at the location of pixel P. With this, precision in identifying a corresponding point higher than the physical resolution is accomplished.

The present invention has been explained by describing a representative embodiment. The embodiment is illustrative in nature and it is obvious to those skilled in the art that numerous modifications and variations in constituting elements and processes are possible and are within the scope of the present invention. Some examples of such modifications and variations will be given below.

In the embodiment, it is assumed that, when the mask region M is an incomputable region, the system waits for successive determination of depth values in the neighborhood of the region M until the region M is no longer an incomputable region. Alternatively, the size of the matching region M may be temporarily or permanently enlarged until a point having a depth value is located within the region. It is desirable anyway that the mask region M adapted for the characteristics of the projected light is set.

For interpolation, it is desirable that points having depth values surround the target point. Therefore, when the points having depth values in the region M do not surround the target point like they are only above the target point, the region M may be treated as an incomputable region.

In the embodiment, linear interpolation is used to determine a depth value by interpolation. Alternatively, arbitrary non-linear interpolation may also be used.

The interpolation for a depth value of a secondary edge point in the depth interpolating section 30 is not restricted to linear interpolation or non-linear interpolation from a plurality of primary points. A provisional depth value of an edge point may be set to a depth value of one of a plurality of primary edge points in the neighborhood of the edge point. This method is effective when the interpolating is executed in the region wherein the surface is sharp. When the region includes a flat surface, on the other hand, interpolation, such as linear interpolation mentioned above, from the depth values is effective.

Similarly, when the interpolation for a depth value of secondary point of interest is executed in the depth interpolating section 30, a provisional depth value of a point of interest may be set to a depth value of one of a plurality of primary points of interest in the neighborhood of the point of interest.

When there is only one primary edge point or primary point of interest in the neighborhood, the depth value of the point of interest may be set to that of the primary edge point or primary point of interest in the neighborhood.

What is claimed is:

1. A depth measuring apparatus comprising:
   an attribute-based searching section for acquiring a corresponding point in a second image, based on an attribute of a point of interest in a first image;
   a depth computing section for computing a depth value of the point of interest for which the corresponding point is acquired, by applying the principle of triangulation;
   a depth interpolating section for computing the depth value of the point of interest for which a corresponding point is not acquired, by interpolation from the depth values of a plurality of points of interest for each of which the depth value is determined;
   a provisional corresponding point acquiring section for determining a provisional corresponding point for the point of interest for which a corresponding point is not acquired, from the computed depth value;

a corresponding point re-computing section for executing region-based search limited to the neighborhood of the provisional corresponding point so as to acquire a more accurate corresponding point than the provisional corresponding point, wherein said depth computing section computes the depth value for the point of interest for which the more accurate corresponding point is acquired by said corresponding point re-computing section.

2. The depth measuring apparatus according to claim 1, wherein the point of interest is an edge point and the attribute is a feature of an image region on both sides of the edge.

3. The depth measuring apparatus according to claim 2, wherein the feature of the image region on both sides of the edge is color of the image region.

4. The depth measuring apparatus according to claim 2, wherein the feature of the image region on both sides of the edge is texture of the image region.

5. The depth measuring apparatus according to claim 1, wherein said depth interpolating section computes the depth value, based on spatial relationship between the plurality of points of interest for each of which the depth value is determined and the point of interest for which a corresponding point is not acquired.

6. The depth measuring apparatus according to claim 1, wherein said corresponding point re-computing section executes region-based search on an epipolar line, in the second image, of the point of interest for which a corresponding point is not acquired, the search on the epipolar line being limited to the neighborhood of the provisional corresponding point.

7. The depth measuring apparatus according to claim 1, wherein said attribute-based searching section detects the point of interest in the first image, by referring to a patterned light projected onto a subject.

8. A depth measuring method comprising the steps of:
acquiring a corresponding point in a second image, based on an attribute of a point of interest in a first image;
computing a depth value of the point of interest for which the corresponding point is acquired, by applying the principle of triangulation;
determining the depth value of the point of interest for which a corresponding point is not acquired, by interpolation from the depth values of a plurality of points of interest for each of which the depth value is determined;
determining a provisional corresponding point for the point of interest for which a corresponding point is not acquired, from the computed depth value;
executing region-based search limited to the neighborhood of the provisional corresponding point so as to acquire a more accurate corresponding point than the provisional corresponding point, and
computing the depth value for the point of interest for which the more accurate corresponding point is acquired by applying the principle of triangulation.

9. The depth measuring method according to claim 8, further comprising the pre-processing steps of:
projecting a patterned light onto a subject; and
detecting the point of interest in the first image by referring to the patterned light projected onto the subject.

10. The depth measuring method according to claim 8, wherein the attribute is a feature of an image region on both sides of the point of interest.

11. The depth measuring method according to claim 8, wherein interpolation from the depth values of the plurality of points of interest for each of which the depth value is determined is executed based on spatial relationship between the plurality of points of interest for each of which the depth value is determined and the point of interest for which a corresponding point is not acquired.

12. The depth measuring method according to claim 8, wherein region-based search is executed on an epipolar line, in the second image, of the point of interest for which a corresponding point is not acquired, the search being limited to a portion of the epipolar line in the neighborhood of the provisional corresponding point.

13. A depth measuring method comprising the steps of:
detecting an edge in a first image;
acquiring, based on an attribute of an edge point on the detected edge, a corresponding point in a second image corresponding to the edge point;
computing a depth value of the edge point for which the corresponding point is acquired, by applying the principle of triangulation;
determining the depth value of the edge point for which a corresponding point is not acquired, by interpolation from the depth values of a plurality of edge points for each of which the depth value is determined;
determining a provisional corresponding point for the edge point for which a corresponding point is not acquired, from the computed depth value;
executing region-based correlation search on an epipolar line, in the second image, of the edge point for which a corresponding point is not acquired, so as to acquire a more accurate corresponding point than the provisional corresponding point, the search being limited to a portion of the epipolar line in the neighborhood of the provisional corresponding point;
computing the depth value for the edge point for which the more accurate corresponding point is acquired, by applying the principle of triangulation; and
determining the depth values of points other than the edge points by interpolation from the depth values of the edge points.

14. The depth measuring method according to claim 13, wherein said step of detecting the edge in the first image further comprises the step of:
projecting a patterned light onto a subject, wherein
the edge is detected by referring to the patterned light projected onto the subject.

15. The depth measuring method according to claim 13, wherein the attribute is a feature of an image region on both sides of the edge.

16. The depth measuring method according to claim 13, wherein interpolation from the depth values of the plurality of edge points for each of which the depth value is determined is executed based on spatial relationship between the plurality of edge points for each of which the depth value is determined and the edge point for which a corresponding point is not acquired.

17. The depth measuring method according to claim 13, wherein the region-based correlation search is executed on a subpixel level.

18. A computer program causing a computer to execute each of the steps of claim 8.

19. A computer program causing a computer to execute each of the steps of claim 13.

* * * * *